United States Patent [19]

Oetiker

[11] Patent Number: 5,230,246

[45] Date of Patent: Jul. 27, 1993

[54] BALANCING ARRANGEMENT FOR ROTATING MEMBER

[75] Inventor: Hans Oetiker, Horgen, Switzerland

[73] Assignee: Hans Oetiker AG Maschinen- und Apparatefabrik, Horgen, Switzerland

[21] Appl. No.: 629,717

[22] Filed: Dec. 18, 1990

Related U.S. Application Data

[63] Continuation-in-part of Ser. No. 446,812, Dec. 6, 1989, and a continuation-in-part of Ser. No. 922,408, Oct. 23, 1986, abandoned, which is a continuation of Ser. No. 622,764, Jun. 20, 1984, abandoned.

[51] Int. Cl.⁵ .................... F16F 15/22; B65D 63/00
[52] U.S. Cl. ..................... 74/573 R; 24/19; 24/200 W; 24/23 EE; 464/180
[58] Field of Search ............. 74/573 R, 574; 464/180; 24/20 R, 20 CW, 20 EE, 20 TT, 20 W, 23 R, 23 EE; 272/119

[56] References Cited

U.S. PATENT DOCUMENTS

| 1,705,895 | 3/1929 | Blair | 24/20 CW |
|---|---|---|---|
| 2,001,165 | 5/1935 | Swennes | 464/180 |
| 2,374,541 | 4/1945 | Hartman | 24/20 TT |
| 3,189,961 | 6/1965 | Heller | 24/20 TT |
| 3,789,463 | 2/1974 | Oetiker | 24/20 CW |
| 3,901,046 | 8/1975 | Hofmann | 74/574 |
| 4,222,155 | 9/1980 | Oetiker | 24/20 EE |
| 4,237,584 | 12/1980 | Oetiker | 24/20 CW |
| 4,299,012 | 11/1981 | Oetiker | 24/20 CW |
| 4,340,996 | 7/1982 | Starace | 24/23 EE |

FOREIGN PATENT DOCUMENTS

| 0783296 | 4/1968 | Canada | 24/20 CW |
|---|---|---|---|
| 0943486 | 12/1963 | United Kingdom | 24/20 CW |

Primary Examiner—Carl D. Friedman
Assistant Examiner—Winnie Yip
Attorney, Agent, or Firm—Paul M. Craig, Jr.

[57] ABSTRACT

A balancing arrangement for a rotating member, especially for hollow shaft made from lightweight metal, in which a counterweight of predetermined size and weight is affixed onto the external surfaces of the rotating member in predetermined position by the use of a clamping band made from a material normally devoid of an significant elastic stretchability. A plastically deformable ear structure is provided in the clamp structure for tightening the clamping band which includes two generally outwardly extending leg portions interconnected by a bridging portion that includes downwardly bent tab-like members along the longitudinal sides of the bridging portion to act as ramp surfaces and reinforcing elements for the ear structure. The counterweight is thereby connected with the clamping band in one place by spot-welding, particularly, when both clamping band and counterweight are made of stainless steel.

38 Claims, 1 Drawing Sheet

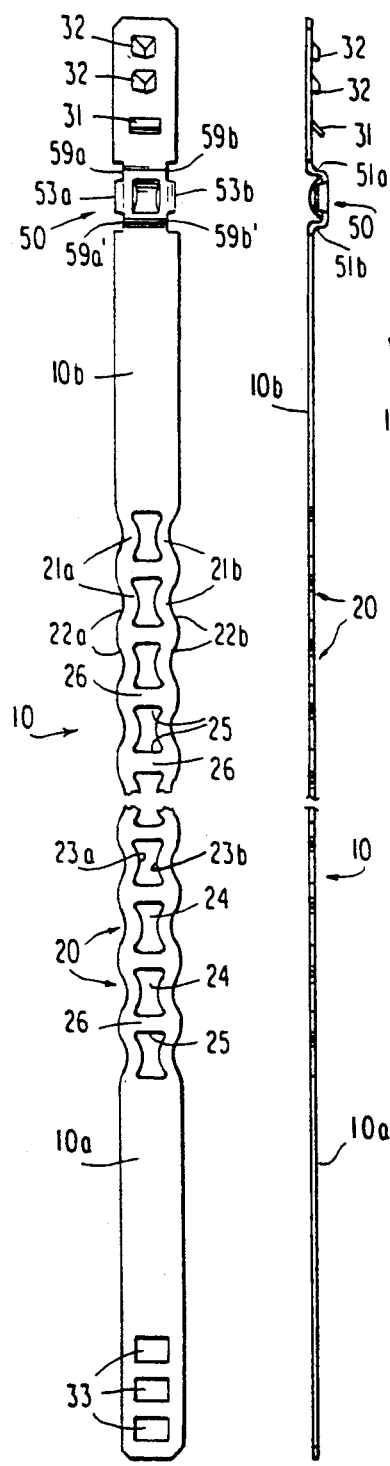
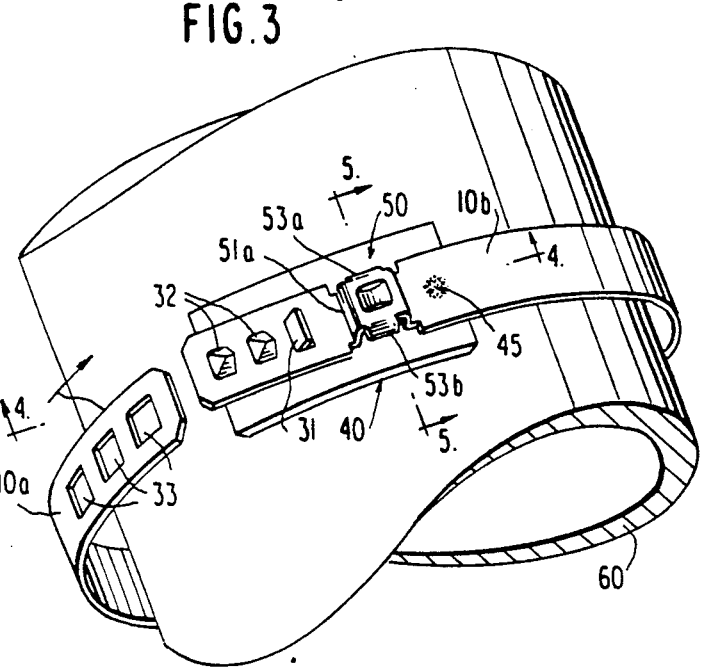
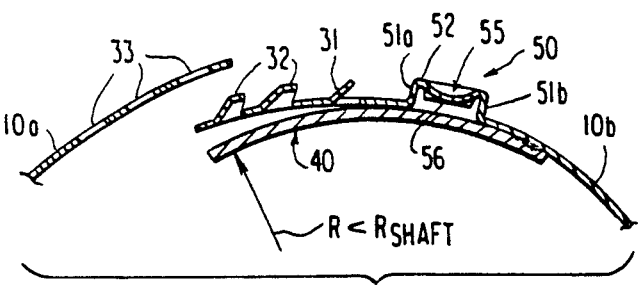
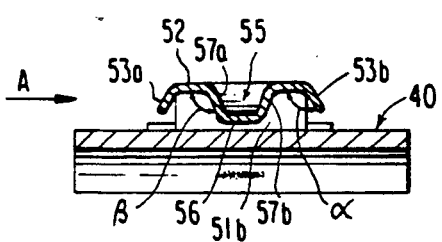

5,230,246

BALANCING ARRANGEMENT FOR ROTATING MEMBER

RELATED CASES

This application is a continuation-in-part application of my prior application Ser. No. 07/446,812, filed on Dec. 6, 1989, and entitled "Balancing Arrangement For Rotating Member and Method of Making Same" and of my copending application Ser. No. 06/922,408, filed on Oct. 23 1986 now abandoned on May 28, 1992, and entitled "Deformable Ear for Clamps" which itself is a continuation application of the then pending application Ser. No. 06/622,764, filed on Jun. 20, 1984, now abandoned on May 6, 1987, and entitled "Deformable Ear For Clamps."

FIELD OF THE INVENTION

The present invention relates to a balancing arrangement, and more particularly to an improved balancing arrangement for hollow rotating members such as hollow drive shafts for motor vehicles.

BACKGROUND OF THE INVENTION

Balancing arrangements by the use of counterweights are known as such in the prior art. Various arrangements have been proposed heretofore which rely on fastening counterweights in the position or positions as determined on a balancing machine rotating the part to be balanced. These machines are known as such, for example, in connection with balancing the wheels of automobiles where counterweights are attached in predetermined positions on the rim of the wheel.

With the advent of hollow drive shafts for motor vehicles made from light-weight metal, such as aluminum or aluminum alloys which have to be balanced, the method of balancing such drive shafts, as used heretofore in the automotive industry, consisted of welding counterweights of predetermined size and weight in predetermined positions. These hollow drive shafts, contrary to prior art solid drive shafts, involved a hollow aluminum construction of larger diametric dimensions than the prior art solid drive shafts used heretofore in the automotive industry for many years. Because aluminum drive shafts as used presently in the automotive industry have a wall thickness of about 2.2 mm., the counterweights had to be welded to the outer surface of the corresponding cylindrical end piece of the universal joint which itself is made of a wall thickness of about 5 mm. The drawbacks of these prior art drive shafts and balancing arrangements are due to the fact that the welding operations not only require longer cylindrical end pieces of the universal joint to accommodate the largest counterweights and their welded connections but additionally are both time-consuming and relatively costly, not to mention problems always inherent with welded connections of this type.

In my aforementioned copending application Ser. No. 07/446,812, the balancing arrangement which effectively resolved the pre-existing problems, utilized a counterweight of selected predetermined size and weight affixed to the external surface of the rotating member by the use of a clamping band made from a material such as stainless steel, devoid of any significant elastic stretchability in the longitudinal direction to which elastic stretchability in the longitudinal direction was imparted by a special configuration of one or more sections in the clamping band. According to another feature of my aforementioned copending application, appropriate anchoring means were provided at the counterweight and/or the clamping band. In my aforementioned copending application, the counterweights were provided with outwardly protruding cold-deformed hook-like members defining therebetween a channel receiving the clamping band so as to prevent lateral movements between the clamping band and the counterweight.

SUMMARY OF THE INVENTION

The present invention involves further improvements in the balancing arrangement of my aforementioned copending application Ser. No. 07/446,812 which increase the holding ability of the balancing arrangement without increase in cost of manufacture and assembly and at the same time avoid problems due to positional changes of the balancing arrangement occasionally encountered heretofore in the course of transfer or displacement movements of the balanced drive shafts.

According to the present invention, a so-called "Oetiker" ear is used in the clamp structure which is provided with two tab-like members bent down in the inward direction of the clamp structure along the longitudinal edges of the bridging portion of the ear. These tab-like members serve a dual purpose in the balancing arrangement according to the present invention. On the one hand, they serve as ramps during displacements or transfers of the drive shafts with installed balancing arrangements to lift any object in the path of axial movement of the drive shaft over the ear structure, thereby precluding or at least minimizing any axial displacement of the balancing arrangement. At the same time, these bent-down tab-like members further reinforce the holding ability of the ear-like structure so that the ear can be closed with even greater force.

According to another feature of the present invention, the reinforcement in the bridging portion of the ear is constructed to assure optimum deformation on the assembly line even if the deforming tool, such as, for example, pneumatic pincers ar not applied completely correctly. This is attained by the use of a shallow reinforcing depression similar to that disclosed in my copending application Ser. No. 06/922,408 and with a slightly concave bottom part, as also already disclosed in this copending application.

According to still a further feature of the present invention which reduces the cost of manufacture and installation, the counterweight of the present invention is fixed to the clamping band by a spot-welded connection, thereby obviating the need for cold-deformed projections or the like to hold the counterweight in place. Welded connections in clamping bands, especially galvanized steel, are not desirable because of the known drawbacks inherent in such welded connections. However, the drawbacks normally attending spot-welded connections are of lesser significance in the balancing arrangement according to the present invention for two reasons. First, the holding ability of the spot-welded connection is of no great concern because the counterweight is held in place by the clamping band once the clamping band is tightened about the counterweight and the drive shaft. Second, the clamping band and the counterweight are made of stainless steel, thereby eliminating those problems normally encountered in particular with galvanized steel. A loosening of the spot-welded connection is therefore of no great concern as long as the spot-welded connection is adequate to hold the parts in preassembled condition, ready for installation.

A balancing weight assembly for drive shafts with a clip whose open ends are interconnected by a screw-type clamping head is disclosed in U.S. Pat. No. 3,901,046. However, in this patent, the clamping head serves as fixed counterweight so that balancing counterweight members to compensate for any excess in weight of the clamping head have to be installed on the clip substantially diametrically opposite the clamping head. Additionally, the balancing arrangement of this patent including its screw-type clamping head fail to provide any compensation for thermal stresses resulting from the relatively elevated temperatures which can occur in hollow drive shafts of relatively larger diameter. Additionally, this prior art balancing arrangement also entails significant disadvantages as regards cost, weight and ease of installation because it normally provides by its clamping head only a single fixed counterweight, which, when not correct, requires more frequently than not one or more additional counterweight members to be mounted opposite the clamping head to compensate for any excess weight of the fixed counterweight formed by the clamping head. It therefore precludes the use of a single counterweight which can be chosen for weight as required and which can be concentrated in the area of the band circumference to optimize its effectiveness in operation.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein:

FIG. 1 is a plan view on a clamp structure for use in the balancing arrangement according to the present invention;

FIG. 2 is a side elevational view of the clamp structure of FIG. 1;

FIG. 3 is a perspective view on a drive shaft with a balancing arrangement according to the present invention before the open ends of the clamping band are interconnected and the clamping band is tightened;

FIG. 4 is a cross-sectional view, taken along line 4—4 of FIG. 3; and

FIG. 5 is a cross-sectional view, on an enlarged scale, taken along line 5—5 of FIG. 3.

DETAILED DESCRIPTION OF THE DRAWINGS

Referring now to the drawing wherein like reference numerals are used throughout the various views to designate like parts, and more particularly to FIGS. 1 and 2, these two figures illustrate a clamping band generally designated by reference numeral 10 preferably made from stainless steel and provided with a number of sections generally designated by reference numeral 20 which impart elastic stretchability to the clamping band, normally devoid of any significant elastic stretchability in its longitudinal direction. Each section 20 thereby consists of two non-rectilinear lateral band portions 21a and 21b that are formed exclusively by cutouts from the clamping band 10. More specifically, the concavely curved side surfaces 22a and 22b are produced by corresponding concave, segmentally shaped cutouts along the sides of the clamping band 10. The inner surfaces 23a and 23b of each lateral band portion 21a and 21b are formed by corresponding surfaces of a cutout 24 in the central area of the clamping band which, in the illustrated embodiment, has the shape at least approximately resembling an hourglass. The non-rectilinear lateral band portions 21a and 21b are thereby of substantially constant width over at least a major part of their length which is attained by substantially parallel surfaces 22a, 23a, and 22b, 23b. Adjacent sections 20 are connected with each other by web portions 26 extending over the normal width of the clamping band which are defined by transversely extending end surfaces 25 of the central cutouts 24 of adjacent sections 20. To avoid peak stresses, the corners between the end surfaces 25 and the side surfaces 23a and 23b are thereby rounded-off. Similarly, the transitions from the side surfaces 22a and 22b to the normal width of the side surfaces of the clamping band are also rounded-off.

The end portions 10a and 10b of the clamping band, devoid of any elastic stretchability-imparting sections 20, include the means for mechanically connecting the open ends of the clamping band and for tightening the clamping, band. More specifically, the clamping band end portion 10b is provided with two cold-deformed hooks 32 and a tab-like guide hook 31. The opposite end portion 10a of the clamping band is provided with apertures 33 to receive the hooks 32 and 31. The mechanical interconnection described so far is of the type disclosed in my U.S. Pat. No. 4,299,012. However, the mechanical interconnection may also be of any other construction known in the art, for example, of the type as disclosed in my prior U.S. Pat. No. 4,622,720.

The counterweight generally designated by reference numeral 40, which is affixed to the clamping band end portion 10b by a single spot-welded connection 45, is of predetermined weight and configuration, for example, of rectangular configuration and is chosen for its size and weight as determined by the requirements for balancing the rotating member. The counterweight 40 is preferably of a curved shape conforming at least approximately to the external surface of the rotating member onto which it is to be affixed and preferably is made with a radius of curvature R (FIG. 4) slightly smaller than the radius of curvature $R_{SHAFT}$ of the external surface of the rotating member 60 so that the tightening forces of the clamp structure will cause the counterweight to elastically adapt itself to the radius of curvature of the rotating member. As a result thereof, the counterweight 40 will anchor itself securely in the predetermined position on the outer surface of the rotating member 60 once the clamping band is tightened.

The tightening means for the clamping band of the illustrated embodiment includes a so-called "Oetiker" ear generally designated by reference numeral 50 which includes two generally outwardly extending leg portions 51a and 51b interconnected by a bridging portion 52. The bridging portion 52 may be provided with a reinforcing groove as described in my prior U.S. Pat. No. 3,402,436 or with a relatively shallow reinforcing depression as disclosed in my copending application Ser. No. 06/922,408, the subject matter of which is incorporated herein by reference (British Patent No. 2,160,577 corresponds to this last-mentioned copending application). However, the ear structure 50 according to the present invention is provided with tab-like members 53a and 53b which are bent down along the longitudinal sides of the bridging portion as shown in FIG. 5 to serve as ramps for any obstacle with which the clamping arrangement may come in contact during transfer of the drive shaft involving axial movement after the balancing arrangement has been installed. These bent-down tab-like members 53a and 53b serve a additional purpose in that they increase the holding ability of the ear so that the clamping band can be tightened with greater force. Any object moving relative to the ear structure 50 in the direction, for example, of arrow A (FIG. 5) will be lifted by the bent-down tab-like member 53a over the surface of the bridging portion 52 of the ear-like structure 50, thereby avoiding the danger that the balancing assembly may be displaced in the axial direction of the drive shaft. The angle α between the generally horizontal top surface of the bridging portion 52 and the tab-like members 53a, 53b may be chosen at will depending on the desired ramp and strengthening effects which vary somewhat inversely as the angle is varied, and, preferably at an angle of about 120° to about 140°.

In order to be able to use a clamping band of constant width without any significant waste of material, substantially rectangular cutouts 59a, 59b, 59a' and 59b' (FIG. 1) are made in the clamping band within the end areas of the ear 50 which, in effect, reduces the width of the ear 50 by utilizing the remaining width of band material for the tab-like members 53a and 53b. The depth of these cutouts depends on the compromise between desired length of the tab-like members and the accepted reduction in width of the bridging portion if a band material of constant width is used.

According to another feature of the present invention, the ear reinforcement generally designated by reference numeral 55, instead of the relatively flat depression as shown in my aforementioned copending application Ser. No. 06/922,408, has a bottom part 56 which continues to be relatively flat as viewed in transverse cross section (FIG. 5) but is slightly concavely shaped as viewed in longitudinal cross section (FIG. 4) as also disclosed already in this last-mentioned copending application. The radius of curvature of the concavely shaped bottom part 56 is thereby substantially greater than the length of the leg portions 51a and 51b. The longitudinal connecting portions 57a and 57b of the reinforcement 55 thereby extend substantially rectilinearly angle β which from the remaining bridging portion 52 with which they form an may be as disclosed in my prior application Ser. No. 06/922,408. The radii of curvature of the rounded-off transitions between the top surface of the bridging portion 52 and the longitudinal connecting portions 57a and 57b are thereby relatively small, particularly as compared to the much larger radius of curvature for the concavely shaped bottom part 56 as seen in longitudinal cross section (FIG. 4). The angle between the longitudinal connecting portions 57a and 57b and the bottom part 56 is then also equal to β; The particular shape of the reinforcement 55 as shown and described herein not only provides a holding ability at least equal to the holding ability as disclosed in my copending application Ser. No. 06/922,408 but assures a more reliable plastic deformation of the ear into the desired shape at the assembly line, where, under the pressure of time, the closing tool, such as a pneumatic pincer-like tool, is not always applied precisely as required for optimum deformation of the ear.

As already described in my copending application Ser. No. 07/446,812, the counterweight 40 and/or the clamping band 10 may again be provided with appropriate anchoring means in the internal surfaces thereof which will anchor the same more securely in the predetermined position on the outer surfaces of the rotating member 60. The anchoring means may be in the form of ragged, non-deburred edges produced by the use of a dull tool for punching-out the counterweight 40, respectively, clamping band 10 and/or may be produced by treatment of the internal surfaces by any known means to produce rough surfaces and/or by selection of the material composition for the counterweight to produce such rough surfaces.

The balancing arrangement according to the present invention entails significant advantages. On the one hand, it is simple to install, relatively inexpensive to manufacture and reliable in operation without the danger of unwanted displacement during movements of the drive shaft on which it is installed. On the other hand, it permits permanent preassembly by a spot-welded connection between the counterweight and the clamping band, particularly when both are made of stainless steel.

As with other balancing arrangements, a number of different sizes and weights of counterweights will be necessary to be stocked to permit balancing of the rotating member with the use of the balancing arrangement according to this invention. As the clamping band may be made of relatively thin band material, the overlap in the area of the free band ends is relatively insignificant to the problem, of achieving a satisfactory balance of the rotating member. Moreover, any imbalance resulting from the overlap can be taken into consideration in the design of the counterweights, as explained in my aforementioned copending application.

While I have shown and described only one embodiment in accordance with the present invention, it is understood that the same is not limited thereto but is susceptible of numerous changes and modifications as known to those skilled in the art. For example, instead of being integral with the clamping band, the ear my be formed in a separate connecting member as disclosed in my aforementioned copending application Ser. No. 07/446,812, the subject matter of which is incorporated herein by reference. Additionally, the elastic stretchability-imparting sections 20 may be modified as long a the elastic stretchability imparted thereby together with the elastic properties of the deformed ear are sufficient to compensate for the expected changes due to temperature. Furthermore, the use of the balancing arrangement in accordance with the present invention is not limited to hollow-rotating members, such as drive shafts, made of aluminum, aluminum alloys or other metallic light-weight materials, but is equally usable with hollow rotating members made from any other appropriate metallic or non-metallic materials, such as synthetic resinous materials, possibly reinforced with fibrous material(s), or any other known materials used in the manufacture of such hollow rotating members.

I therefore do not wish to be limited to the details shown and described herein but intend to cover all such changes and modifications as are encompassed by the scope of the appended claims.

I claim:

1. A balancing arrangement for eliminating imbalances during rotation, comprising counterweight means of predetermined size and weight selected to compensate for an imbalance in a rotating member, and a clamp structure operable to tightly engage external surfaces of the rotating member and of the counterweight means with the latter in a predetermined position for fixedly securing said counterweight means onto the external surfaces of said rotating member in said predetermined position, said clamp structure including longitudinally extending clamping band means having free ends, connecting means for mechanically connecting the free ends of said clamping band means and means for tightening the clamping band means about a rotating member to be balanced and said counterweight means, said tightening means including plastically deformable ear means having generally outwardly extending leg portions interconnected by a bridging portion with a top surface, and said bridging portion being provided with reinforcing means including tab-like members bent downwardly along longitudinal sides of the bridging portion so that said tab-like members at the same time provide a ramp surface which is adopted to lift any object which may move axially relative to the clamp structure over the top surface of the bridging portion and at the same time increasing the holding ability of the plastically deformable ear means.

2. A balancing arrangement according to claim 1, wherein said ear means is formed integrally with at least a portion of the clamping band means and wherein the bridging portion has a width in its non-reinforced condition which is smaller than a width of the clamping band means.

3. A balancing arrangement according to claim 2, wherein approximately rectangular cutouts are formed in the clamping bank portion within areas of each of the ear means on both sides of the clamping band portion.

4. A balancing arrangement according to claim 3, characterized in that end surfaces of a respective tab-like member, as viewed in top plan view on the ear means, converge toward one another.

5. A balancing arrangement according to claim 3, wherein said counterweight means is secured to the clamping band portion by a spot-welded connection.

6. A balancing arrangement according to claim 1, characterized in that end surfaces of a respective tab-like member, as viewed top plan view on the ear means, converge toward one another.

7. A balancing arrangement according to claim 1, wherein said counterweight means is secured to the clamping band means by a spot-welded connection.

8. A balancing arrangement according to claim 7, wherein at least one of said counterweight means and of said clamping band means includes means for anchoring the same in the external surfaces of the rotating member.

9. A balancing arrangement according to claim 8, wherein the anchoring means are formed at least in part by ragged, non-deburred edges obtained by at least one of cutting and stamping operations with the use of relatively dull tools.

10. A balancing arrangement according to claim 9, wherein the anchoring means in at least one of said clamping band means and of said counterweight means are formed at least in part by non-smooth internal surfaces realized at least in part by at least one of material composition, manufacture and after-treatment of the respective part to obtain the desired internal anchoring surfaces.

11. A balancing arrangement according to claim 1, wherein the clamping band means includes further means for imparting to the clamping band means predetermined elastic stretchability in its longitudinal direction.

12. A balancing arrangement according to claim 11, wherein said further means include at least one section having non-rectilinear lateral band portions on both sides of a center longitudinal plane of the clamping band means.

13. A balancing arrangement according to claim 12, wherein said lateral non-rectilinear band portions are formed by at least one window means disposed in the center area of the clamping band means and wherein external sides of the non-rectilinear band portion of said clamping band means are curved concavely.

14. A balancing arrangement according to claim 13, wherein the non-rectilinear lateral band portions are formed between a respective side surface of the clamping band means and the corresponding adjacent side of the window means, and wherein each of the two lateral band portions is at least of approximately constant width over a substantial part of its length.

15. A balancing arrangement according to claim 14, wherein a respective window means has a shape at least approximately resembling an hourglass.

16. A balancing arrangement according to claim 11, wherein the further means are substantially symmetrical with respect to a center longitudinal plane of the clamping band means.

17. A balancing arrangement according to claim 16, wherein the clamping band means includes several sections containing such further means, and wherein a transversely extending web portion of substantially full band width connects adjacent sections.

18. A balancing arrangement according to claim 17, wherein said further means are formed by openings in the clamping band means located at least within an area opposite the connecting means when the clamping band means is installed over the rotating member and the counterweight means.

19. A balancing arrangement according to claim 18, wherein at least some of said openings are generally of the same shape.

20. A balancing arrangement according to claim 1, wherein said reinforcing means includes at least one relatively shallow depression means occupying at least a substantial portion of the total area of the bridging portion in its non-reinforced condition.

21. A balancing arrangement according to claim 20, wherein said depression means has a bottom part which is substantially flat as viewed in transverse cross section through the bridging portion.

22. A balancing arrangement according to claim 21, wherein the bottom part of the depression means is of concave shape as viewed in longitudinal cross section with a radius of curvature that is substantially larger than the length of the leg portions.

23. A balancing arrangement according to claim 22, wherein said radius of curvature is a multiple of the length of the tab-like members.

24. A balancing arrangement according to claim 1, wherein the reinforcing means includes a generally longitudinally extending depression whose bottom extends substantially rectilinearly in all cross sections transverse to the longitudinal direction of the clamping band means over a substantial part of its length.

25. A balancing arrangement according to claim 1, wherein said connecting means is located within a circumferential area of the clamping band means in which any weight of the connecting means is in effect additive to the weight of the selected counterweight means.

26. A balancing arrangement according to claim 25, wherein said clamping band means is made from one of galvanized and stainless steel material substantially devoid of any significant elastic stretchability in its longitudinal direction, and further means in said clamping band means for imparting to said clamping band means predetermined elastic stretchability in its longitudinal direction.

27. A balancing arrangement according to claim 26, wherein the rotating member to be balanced is a hollow drive shaft made from a light-weight metal or alloy thereof.

28. A balancing arrangement according to claim 27, wherein at least one of the counterweight means and of the clamping band means includes means for anchoring the dampining band means in the external surfaces of the rotating member.

29. A balancing arrangement according to claim 25, wherein the entire counterweight means is located within said area.

30. A balancing arrangement according to claim 25, wherein said counterweight means is formed by a single counterweight structure selected for its weight and located within said circumferential area is used.

31. A balancing arrangement for eliminating imbalances during rotation, comprising counterweight means of predetermined size and weight, and a clamp structure adapted to be tightened about a rotating member and said counterweight means to tightly engage external surfaces of the rotating member to be balanced and of the counterwieght means with the latter in a predetermined position for fixedly securing said counterweight means onto the external surfaces of said rotating member is said predetermined position including longitudinally extending clamping band means, connecting means for mechanically connecting the free ends of said clamping band means within a circumferential area of the counterweight means, and tightening means in said clamp structure for tightening the clamping band means about the external surfaces of the rotating member and of the counterweight means including a plastically deformable ear means having generally outwardly extending leg portions in planes transverse to the longitudinal direction interconnected by a longitudinally extending bridging portion having a top surface, said bridging portion having tab-like members bent down along its longitudinal sides so that said tab-like members at the same time provide a ramp surface which is adapted to lift any object which may move axially relative to the clamp structure over the top surface of the bridging portion and at the same time increasing the holding ability of the plastically deformable ear means which when plastically deformed provides elastic compensation for diametric changes in the rotating member and thereby causes the counterweight means to remain fixedly secured to the external surfaces of the rotating member in the presence of thermal changes of the rotating member.

32. A balancing arrangement according to claim 31 wherein said clamping band means is made from material substantially devoid of any significant elastic stretchability in its longitudinal direction, and further means in said clamping band means for imparting to said clamping band means predetermined elastic stretchability in its longitudinal direction.

33. A balancing arrangement according to claim 32, wherein said further means include non-rectilinear lateral band portions in said clamping bank means located on both sides of its center longitudinal plane and openings substantially symmetrical with respect to the center longitudinal plane.

34. A balancing arrangement according to claim 33, wherein said counterweight means has concavely shaped internal surfaces with a radius of curvature at most equal to that of the rotating member.

35. A balancing arrangement according to claim 33, wherein at least one of the clamping band means and of the counterweight means includes means for anchoring the clamping band means or the counterweight means in the external surfaces of the rotating member and of the counterweight means.

36. A balancing arrangement according to claim 31, wherein the counterweight means and connecting means are separate structural parts but located in the same circumferential area of the clamp structure.

37. A balancing arrangement according to claim 36, wherein the counterweight means together with the connecting and tightening means are concentrated within said circumferential area, with the counterweight means selected as to weight so as to compensate for all of the imbalance in the rotating member.

38. A balancing arrangement according to claim 37, wherein the selected counterweight means is located exclusively with said circumferential area.

* * * * *